Nov. 13, 1956      H. F. FEUERLEIN      2,770,089
SICKLE BAR DRIVE ADAPTOR FOR ATTACHMENT TO REEL TYPE MOWER
Filed Dec. 13, 1952
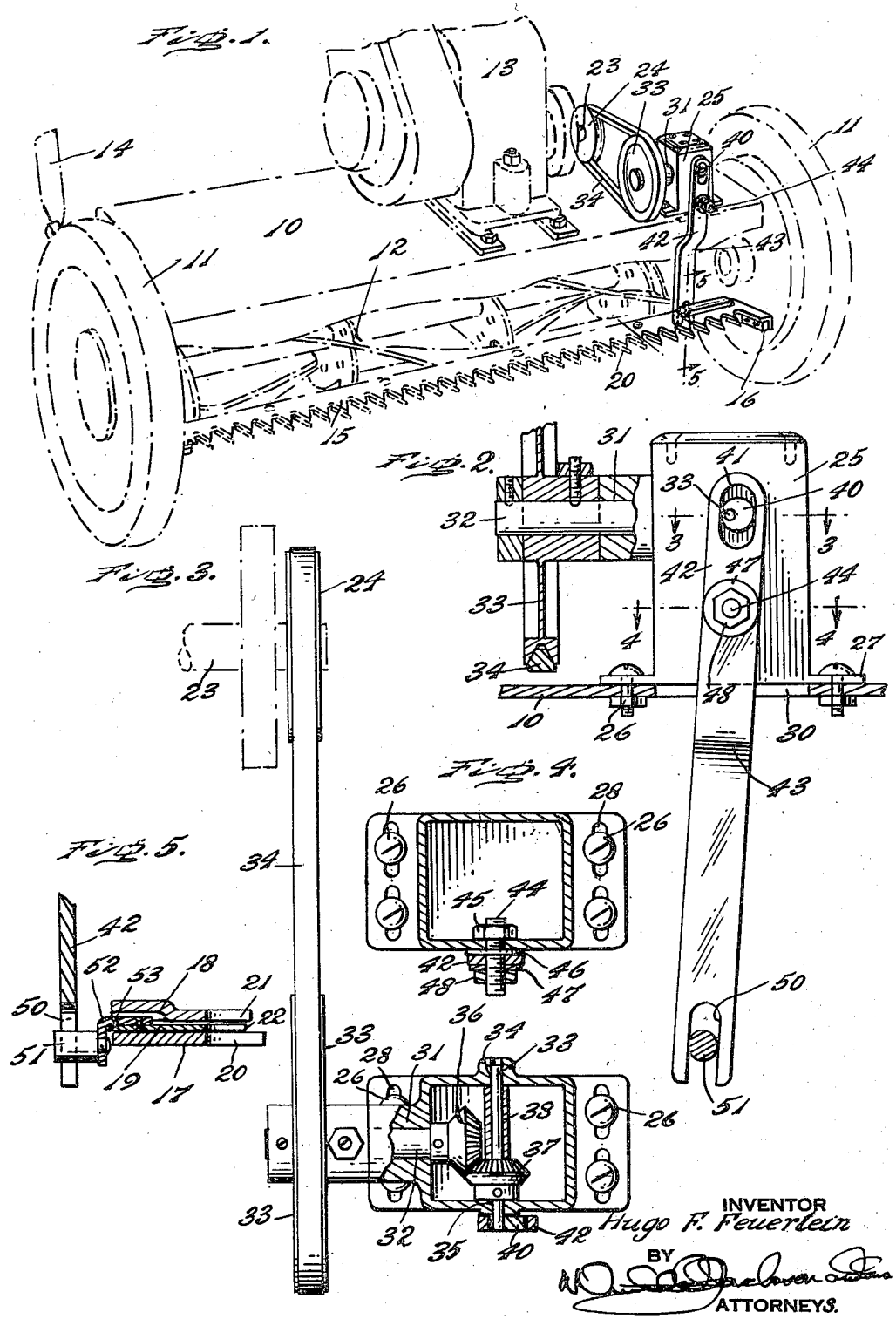
INVENTOR
Hugo F. Feuerlein
BY
ATTORNEYS.

United States Patent Office 2,770,089
Patented Nov. 13, 1956

2,770,089

SICKLE BAR DRIVE ADAPTOR FOR ATTACHMENT TO REEL TYPE MOWER

Hugo F. Feuerlein, Philadelphia, Pa.

Application December 13, 1952, Serial No. 325,828

1 Claim. (Cl. 56—238)

The present invention relates to adaptors for driving sickle bars on lawn mowers, and mowing machines generally.

A purpose of the invention is to provide a more rugged sickle bar adaptor drive, in one unit, which is bolted to the mower chassis, and which will be less subject to maintenance requirements.

A further purpose is to simplify the construction of a sickle bar drive so that it can be readily placed upon many different makes of machines, and can be maintained and repaired by the user with a minimum of effort.

A further purpose is to provide an an adaptor which can be operated from the direct end of the motor shaft.

A further purpose is to provide a pivoted eccentric strap which drives the sickle bar by the motion of the remote end of the strap.

A further purpose is to place a belt drive between the motor shaft and the adaptor shaft, which belt is capable of slippage, if an obstacle should be lodged between the cutter blades.

A further purpose is to drive a shaft parallel to the direction of reciprocation of the sickle bar, to intergear this shaft with a second shaft at right angles to the direction of reciprocation of the sickle bar, to mount an eccentric on the second shaft, to pivot an eccentric strap cooperating with the eccentric at a point between the eccentric and the opposite end of the strap, and to interconnect the opposite end of the strap and the sickle bar by a pin and slot connection.

A further purpose is to use an adaptor unit which encloses gears in a box in which grease is placed to protect the gears and with a cover or closure of the box.

A further purpose is to provide a disconnecting means to allow the driven pulley to rotate freely if desired.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a fragmentary phantom perspective of a lawn mower, with sickle bar attachments, showing the sickle bar driving adaptor of the present invention in place in correct driving position, parts of the bars being shown in dot and dash lines and other parts in full lines.

Figure 2 is a fragmentary enlarged front elevation of the device of the invention, partly in section on the axis of the first driven shaft.

Figure 3 is an enlarged plan view of the device of the invention, partly in section on the line 3—3 of Figure 2.

Figure 4 is a section on the line 4—4 of Figure 2.

Figure 5 is a fragmentary enlarged vertical section through the pin and slot connection to the sickle bar, the section being taken on the line 5—5 of Figure 1.

Describing in illustration but not in limitation and referring to the drawings:

Many power lawn mowers are equipped with sickle bar attachments for use in cutting weeds and very long grass. It has been difficult in many instances to drive the sickle bar from the lawn mower engine, as the sickle bar is located forward of most of the other mechanism and must be reciprocated. Many of the drives used have involved several sets of complicated enclosed gear combinations, and have been beyond the ability of the user or the less experienced mechanic to service and maintain. They have also been very vulnerable to damage by striking objects, and by clogging or jamming through introduction of foreign matter, such as dirt, grass cuttings and leaves. One of the main advantages presented by the device of the invention is its great ruggedness and simplicity, so that maintenance can readily be carried on by the user or by shops not especially equipped, and many minor mishaps can be corrected inexpensively. Thus where the eccentric strap is bent due to collision with some object such as a stone or tree, it can readily be straightened out and restored to service. Where, however, shafting and gearing have been carried down in front to an exposed position near the sickle bar, it has been very difficult to repair after a collision.

The device of the invention, besides being rugged, is very simply and easily understood, easy to lubricate, and reliable in service.

Figure 1 shows a power lawn mower of a conventional type having a frame 10, mounting wheels 11, having a conventional rotary lawn mower blade assembly 12, rotatably mounted and driven by an engine 13, suitably a portable internal combustion engine of a gasoline mower. The device is guided by a handle 14. It is intended that it shall be in every respect a conventional showing of such a lawn mower.

In front of the rotary lawn mower blade assembly 12 is a sickle bar attachment 15 which extends transversely of the lawn mower across between the wheels, and is mounted from brackets 16 on the frame at the opposite ends. The sickle bar suitably consists of a sickle blade supporting bar 17 (Figure 5), a sickle guard bar 18 above and in spaced relation to the supporting bar 17 and a sickle blade 19 between the supporting bar 17 and the blade 18 which moves back and forth in reciprocation.

Each of the elements 17, 18 and 19 has forwardly directed teeth 20, 21 and 22 respectively which accomplish the cutting as well known when the sickle bar reciprocates.

The main driving shaft 23 of the engine carries a pulley 24, which may be a pulley originally provided to permit the lawn mower to drive auxiliary equipment, or may be a pulley added especially for driving the sickle bar. At the front of the frame and suitably at one side convenient to the pulley 24 I place a housing 25 conveniently of rectangular shape, and desirably adjustably mounted as by bolts 28 to the frame. The base flanges 27 through which the bolts extend suitably through elongated slots 28 through which the bolts extend which permit adjustment of the housing forwardly and rearwardly as desired.

The frame is desirably slotted beneath the housing at 30 to permit extension of the drive downwardly to connect with the sickle bar.

The housing has a bearing 31 which journals a first driven shaft 32 which carries secured to its outer end a pulley 33 interconnecting by belt 34 with the pulley 24. While the interconnection is through a belt and pulleys, it will be understood that any equivalent form of interconnection may be employed, although I prefer to employ a belt because it will allow slippage in case a foreign object should lodge between the cutter blades.

Extending transversely to the first driven shaft 32 across the housing is a second driven shaft 33, which is journalled at opposite ends in the housing in bearings 34 and 35. The first and second driven shafts are interconnected by bevelled gears 36 and 37. A tubular spacer 38 around shaft 33 prevents the shaft from moving axially, since the bevel gear 37 engages one side of the housing. All of the gears in the housing operate in grease in the housing container. The second driven shaft 33 suitably at the end outside the housing carries rigidly mounted thereon an eccentric 40 which engages on the inside of an oval slot 41 in operative relation on an eccentric strap 42 which extends downwardly and below the housing and is suitably rearwardly bent at 43 so that it will reach a position behind the sickle bar.

At a position slightly below the eccentric the housing carries a fixed pivot 44 for the eccentrically operated strap. The fixed pivot in the form shown desirably consists of a stud threaded through the housing, and secured by a lock nut 45 on the inside. On the outside a flange 46 is placed between the housing and the eccentric strap, and the eccentric strap at the outside is held loosely for pivoting by a washer 47 and a nut 48.

At the lower end the eccentric strap has a slot or fork 50 which receives and surrounds in operative engagement a pin 51 which is mounted on a bracket 52 secured suitably as by rivets 53 to the sickle bar blade.

It will be evident that when the adaptor is to be removed, suitably at a time that the sickle bar is taken off, it is merely necessary to loosen bolts 26, and the adaptor housing, pulley 33 and eccentric strap 42 will come off, the pin 51 coming out of the fork 50 and the pin remaining with the sickle bar assembly.

In operation, the sickle bar is driven by driving shaft 23 which drives pulley 33 through pulley 24 and belt 34. The pulley 33 drives the first driven shaft 32, which drives eccentric 40 through gears 36 and 37. The eccentric swings eccentric strap about pivot 44, and this reciprocates the pin 51 and the sickle bar blade by fork 50.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

An adapter for driving a sickle bar extending transversely across a motor-driven lawn mower having a frame, from a motor shaft extending generally across the lawn mower above the frame and carrying a pulley, consisting of an adapter housing, provided with means to removably and adjustably fasten the adapter on the frame, a first shaft journalled in the adapter housing and extending outside thereof at one end, pulley means on the first shaft outside the housing and adapted to connect with the lawn mower motor shaft pulley by means of a belt, gear means on the first shaft inside the housing, a second shaft in the housing journalled thereon and extending outside the housing and transversely to the first shaft, gear means in the housing on the second shaft cooperating with the gear means on the first shaft, an eccentric on the second shaft outside the housing, an eccentric strap pivot on the outside of the housing below the eccentric and an elongated eccentric strap extending below the frame, having an eccentric strap opening at one end surrounding and engaging the eccentric and having a fork at the opposite end adapted to engage the sickle bar, the eccentric strap being pivoted on the eccentric strap pivot between the two ends of the eccentric strap.

References Cited in the file of this patent
UNITED STATES PATENTS

| | | |
|---|---|---|
| 797,742 | McCord | Aug. 22, 1905 |
| 911,073 | Rober | Feb. 2, 1909 |
| 1,876,662 | Gravely | Sept. 13, 1932 |
| 2,314,073 | Campbell | Mar. 16, 1943 |
| 2,328,803 | Hayes | Sept. 7, 1943 |
| 2,638,068 | Gottlieb | May 12, 1953 |